US012535613B2

(12) United States Patent
Schmid

(10) Patent No.: US 12,535,613 B2
(45) Date of Patent: Jan. 27, 2026

(54) NEUTRON ABSORBING DOPANT FOR REDUCING BOREHOLE FLUID BACKGROUND IN GEOCHEMICAL LOGGING

(71) Applicant: Halliburton Energy Services, Inc., Houston, TX (US)

(72) Inventor: Gregory Joseph Schmid, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 191 days.

(21) Appl. No.: 18/404,342

(22) Filed: Jan. 4, 2024

(65) Prior Publication Data

US 2025/0224536 A1    Jul. 10, 2025

(51) Int. Cl.
*G01V 5/10* (2006.01)
*G01V 5/14* (2006.01)

(52) U.S. Cl.
CPC .............. *G01V 5/102* (2013.01); *G01V 5/145* (2013.01)

(58) Field of Classification Search
CPC ................................ G01V 5/102; G01V 5/145
See application file for complete search history.

(56) References Cited

U.S. PATENT DOCUMENTS

| 10,053,979 | B2 | 8/2018 | Rasmus et al. |
| 11,048,015 | B2 | 6/2021 | Schmid et al. |
| 11,480,046 | B2 | 10/2022 | Krueger et al. |
| 11,555,941 | B1 | 1/2023 | Schmid et al. |
| 2012/0080588 | A1 | 4/2012 | Smith, Jr. et al. |
| 2013/0062057 | A1 | 3/2013 | Smith, Jr. |
| 2019/0033484 | A1 | 1/2019 | Stoller et al. |
| 2022/0252755 | A1* | 8/2022 | Zhan ...................... E21B 49/00 |

FOREIGN PATENT DOCUMENTS

| NO | 141067 B | * | 9/1979 | ............. G01V 5/102 |
| WO | 2021081092 | | 4/2021 | |

OTHER PUBLICATIONS

International Search Report and Written Opinion for International Patent Application No. PCT/US2024/012224 dated Sep. 11, 2024. PDF file. 10 pages.

* cited by examiner

*Primary Examiner* — David J Makiya
*Assistant Examiner* — Fani Polyzos Boosalis
(74) *Attorney, Agent, or Firm* — Benjamin Ford; C. Tumey Law Group PLLC

(57) ABSTRACT

Disclosed herein are methods and system for determining an elemental composition of a downhole formation using neutron-induced gamma ray spectroscopy and doping the borehole fluid with a neutron absorber to remove at least part of the borehole thermal neutron flux before it can capture borehole nuclei and emit gamma rays within a spectral range of interest. For example, a method for determining the elemental composition includes adding a dopant to a borehole fluid, wherein the dopant absorbs thermal neutrons in the borehole, lowering a logging tool comprising a gamma ray spectrometer, emitting neutrons into a downhole environment, generating neutron-induced gamma rays comprising borehole gamma rays and formation gamma rays, detecting gamma rays from the downhole formation, and extracting the elemental composition of the downhole formation. The dopant may not emit gamma rays above 0.5 MeV or their peaks background should be predictable and/or consistent to be removed during data processing.

20 Claims, 9 Drawing Sheets

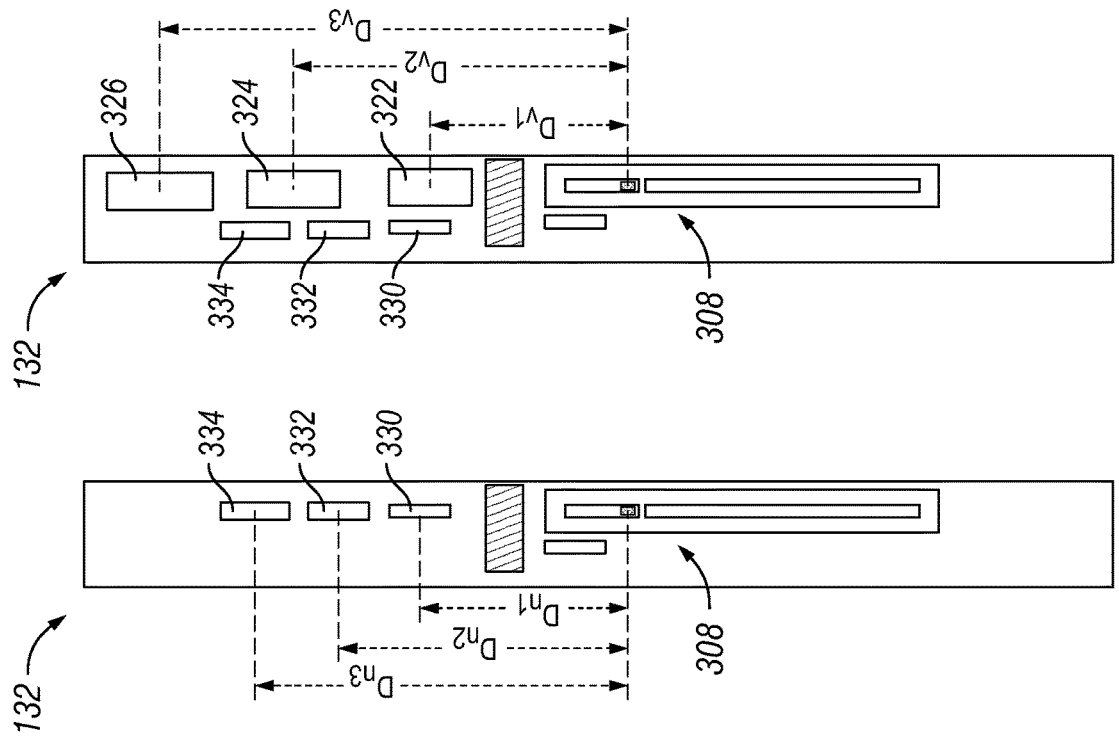
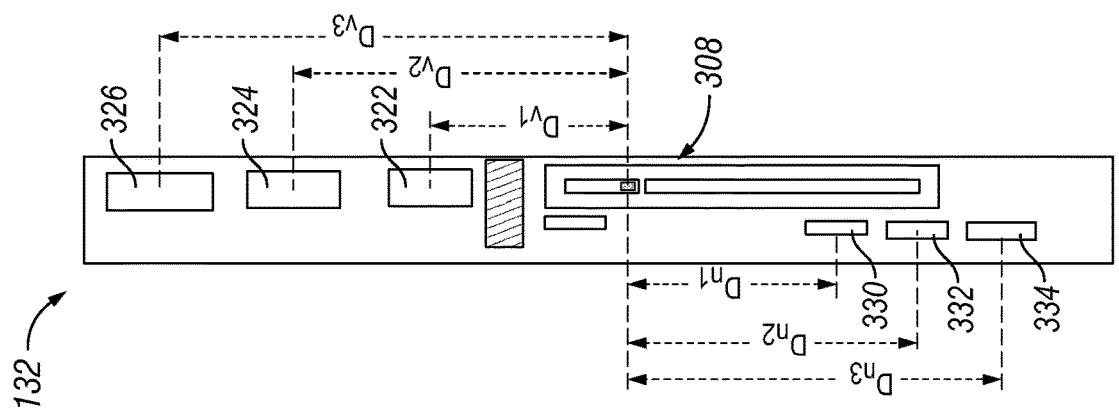
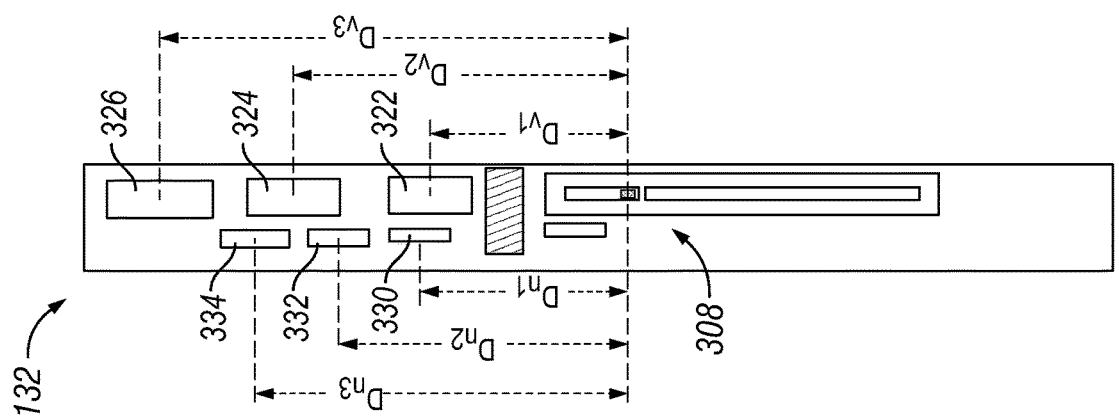
FIG. 4A   FIG. 4B   FIG. 4C   FIG. 4D

NEUTRON ABSORBING DOPANT FOR REDUCING BOREHOLE FLUID BACKGROUND IN GEOCHEMICAL LOGGING

BACKGROUND

Wellbores drilled into subterranean formations may enable recovery of desirable fluids (e.g., hydrocarbons) using a number of different techniques. During drilling operations, slickline operations, or during wireline operations, measurements may be taken to determine the presence of oil, water, gas, and/or the like. One such device that may be utilized for these measurements may be a pulsed neutron tool. The pulsed neutron tool may comprise a pulsed neutron generator (PNG) that may operate and function to transmit neutrons into a formation for either logging while drilling (LWD) or wireline logging measurements.

BRIEF DESCRIPTION OF THE DRAWINGS

These drawings illustrate certain aspects of some examples of the present disclosure and should not be used to limit or define the disclosure.

FIG. 4A-4D are diagrams illustrating different distances between parts within the pulsed neutron logging tool.

DETAILED DESCRIPTION

The present disclosure generally relates to systems and methods for determining the elemental composition of downhole formations using a logging while drilling tool, a wireline tool, or any other well-based tool. More specifically, the present disclosure relates to a geological logging tool using neutron-induced gamma ray spectroscopy and doping the borehole fluid with a neutron absorber to remove at least part of the borehole thermal neutron flux before it can capture on borehole nuclei and emit gamma rays within the spectral range of interest. In embodiments, the dopant of the borehole fluid may have a high neutron absorption cross-section. In some embodiments, the dopant of the borehole fluid does not emit gamma ray in the spectral range of interest, such as E>0.5 MeV, E>0.4 MeV, E>0.3 MeV, E>0.25 MeV; or E>0.2 MeV. For example, a method for determining the elemental composition of a downhole formation includes adding a dopant to a borehole fluid, wherein the dopant absorbs thermal neutrons in the borehole, lowering a logging tool comprising a gamma ray spectrometer, emitting neutrons into a downhole environment, generating neutron-induced gamma rays comprising borehole gamma rays and formation gamma rays, detecting gamma rays from the downhole formation, and extracting the elemental composition of the downhole formation.

Figure 1:
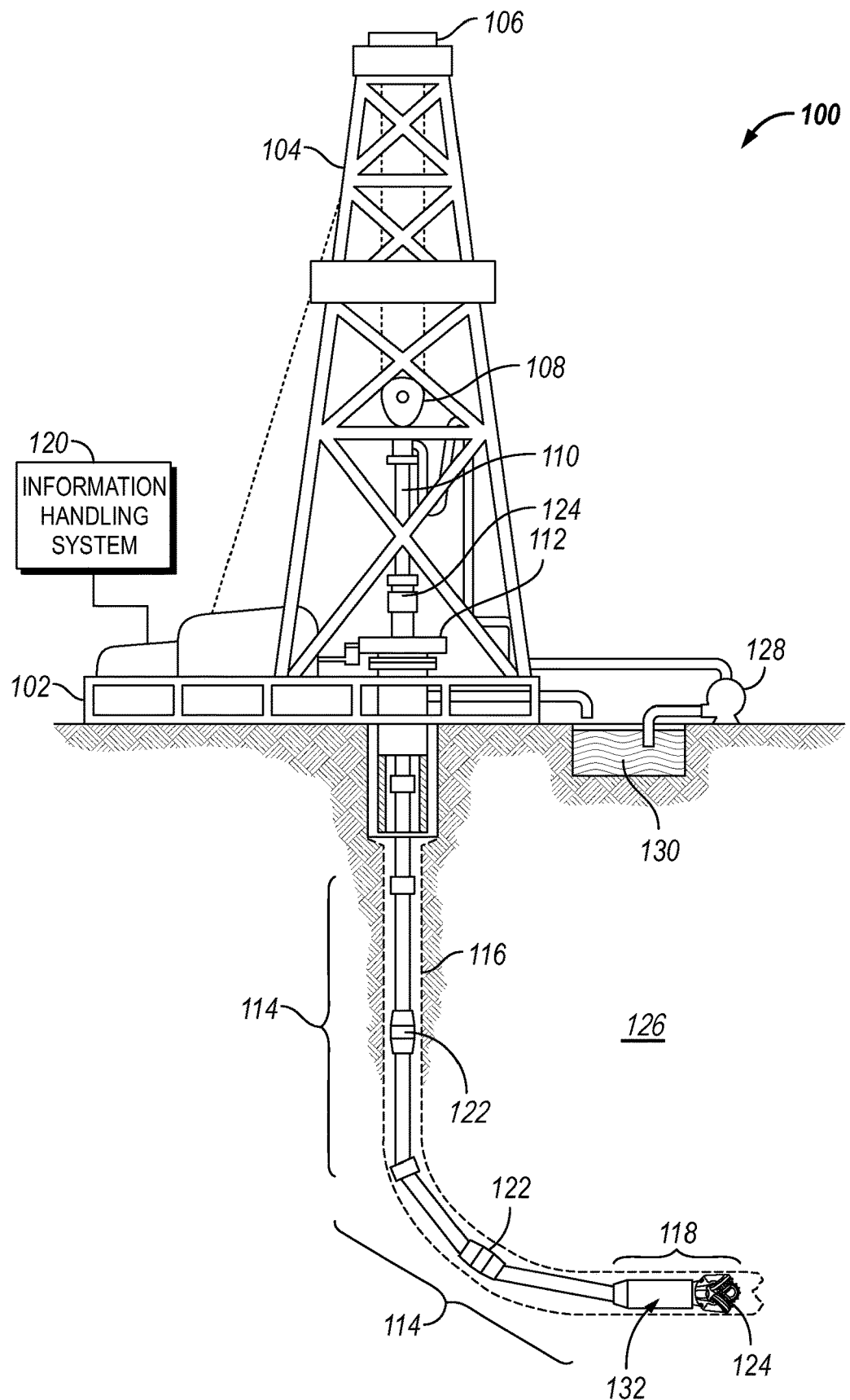
FIG. 1 illustrates a logging while drilling operation utilizing a pulsed neutron logging tool, in accordance with examples of the present disclosure.

FIG. 1 is a diagram of an example drilling environment. Drilling environment 100 may include platform 102 that supports derrick 104 having a traveling block 108 for raising and lowering top drive 110 and drillstring 114. Top drive 110 supports and rotates drillstring 114 as it is lowered through wellhead 112. In turn, drill bit 124, located at the end of drillstring 114, may create borehole 116. Borehole 116 may be formed through the Earth surface into a subterranean formation 126 in the Earth crust. Bottom-hole assembly 118 may include a pulsed neutron logging tool 132 (e.g., having a scintillator that is $CeBr_3$) for logging while drilling operations. Each of these components is described below. Pulsed neutron logging tool 132 may be a dual-purpose (dual application) gamma-ray spectroscopy logging tool in contemporaneously (e.g., simultaneously) detecting (facilitating measuring) both (1) neutron-induced gamma rays from the subterranean formation 126 and (2) natural gamma rays from the subterranean formation 126. In implementations for logging while drilling, such dual application can reduce complexity of bottom-hole assembly 118 and save rig time in facilitating spectroscopic measurements of both neutron-induced gamma rays and natural gamma rays in a single run (in the same run) into borehole 116.

Platform 102 is a structure which may be used to support one or more other components of drilling environment 100 (e.g., derrick 104). Platform 102 may be designed and constructed from suitable materials (e.g., concrete) which are able to withstand the forces applied by other components (e.g., the weight and counterforces experienced by derrick 104). In any embodiment, platform 102 may be constructed to provide a uniform surface for drilling operations in drilling environment 100.

Derrick 104 is a structure which may support, contain, and/or otherwise facilitate the operation of one or more pieces of the drilling equipment. In any embodiment, derrick 104 may provide support for crown block 106, traveling block 108, and/or any part connected to (and including) drillstring 114. Derrick 104 may be constructed from any suitable materials (e.g., steel) to provide the strength necessary to support those components.

Crown block 106 is one or more simple machine(s) which may be rigidly affixed to derrick 104 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 104 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring 114 (e.g., via top drive 110) and allow for drillstring 114 (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses nonparallel tension). Traveling block 108 may move vertically (e.g., up, down) within derrick 104 via the extension and retraction of the drilling line.

Top drive 110 is a machine which may be configured to rotate drillstring 114. Top drive 110 may be affixed to traveling block 108 and configured to move vertically within derrick 104 (e.g., along with traveling block 108). In any embodiment, the rotation of drillstring 114 (caused by top drive 110) may allow for drillstring 114 to carve borehole 116. Top drive 110 may use one or more motor(s) and gearing mechanism(s) to cause rotations of drillstring 114. In any embodiment, a rotatory table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Drillstring 114 is a machine which may be used to carve borehole 116 and/or gather data from borehole 116 and the surrounding geology. Drillstring 114 may include one or more drillpipe(s), one or more repeater(s) 120, and bottom-hole assembly 118. Drillstring 114 may rotate (e.g., via top drive 110) to form and deepen borehole 116 (e.g., via drill bit 124) and/or via one or more motor(s) attached to drillstring 114.

Borehole 116 is a hole in the ground which may be formed by drillstring 114 (and one or more components thereof). Borehole 116 may be partially or fully lined with casing to protect the surrounding ground from the contents of borehole 116, and conversely, to protect borehole 116 from the surrounding ground.

Bottom-hole assembly 118 is a machine which may be equipped with one or more tools for creating, providing structure, and maintaining borehole 116, as well as one or more tools for measuring the surrounding environment (e.g., measurement while drilling (MWD), logging while drilling (LWD)). In any embodiment, bottom-hole assembly 118 may be disposed at (or near) the end of drillstring 114 (e.g., in the most "downhole" portion of borehole 116).

Non-limiting examples of tools that may be included in bottom-hole assembly 118 include a drill bit (e.g., drill bit 124), casing tools (e.g., a shifting tool), a plugging tool, a mud motor, a drill collar (thick-walled steel pipes that provide weight and rigidity to aid the drilling process), actuators (and pistons attached thereto), a steering system, and any measurement tool (e.g., sensors, probes, particle generators, etc.).

Further, bottom-hole assembly 118 may include a telemetry sub to maintain a communications link with the surface (e.g., with information handling system 120). Such telemetry communications may be used for (i) transferring tool measurement data from bottom-hole assembly 118 to surface receivers, and/or (ii) receiving commands (from the surface) to bottom-hole assembly 118 (e.g., for use of one or more tool(s) in bottom-hole assembly 118). In examples, telemetry communications may be at least in part between bottom-hole assembly 118 and information handling system 120.

As illustrated, the information handling system 120 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price.

Information handling system 120 may include a processing unit (e.g., microprocessor, central processing unit, etc.) that may process drilling data from rotary steerable system (RSS) 242, discussed below, by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 120 may also include input device(s) (e.g., keyboard, mouse, touchpad, etc.) and output device(s) (e.g., monitor, printer, etc.). The input device(s) and output device(s) provide a user interface that enables an operator to interact with any device disposed or a part of bottom-hole assembly 118, discussed below, and/or software executed by a processing unit. For example, information handling system 120 may enable an operator to select analysis options, view collected log data, view analysis results, and/or perform other tasks.

Non-limiting examples of techniques for transferring tool measurement data (to the surface) include mud pulse telemetry and through-wall acoustic signaling. For through-wall acoustic signaling, one or more repeater(s) 122 may detect, amplify, and re-transmit signals from bottom-hole assembly 118 to the surface (e.g., to information handling system 120), and conversely, from the surface (e.g., from information handling system 120) to bottom-hole assembly 118.

Repeater 122 is a device which may be used to receive and send signals from one component of drilling environment 100 to another component of drilling environment 100. As a non-limiting example, repeater 122 may be used to receive a signal from a tool on bottom-hole assembly 118 and send that signal to information handling system 120. Two or more repeaters 122 may be used together, in series, such that a signal to/from bottom-hole assembly 118 may be relayed through two or more repeaters 122 before reaching its destination.

A transducer is a device that may work with repeater 122 to transfer information from the surface to bottom-hole assembly 118. A transducer may be configured to convert non-digital data (e.g., vibrations, other analog data) into a digital form suitable for information handling system 120. As a non-limiting example, the one or more transducer(s) may convert signals between mechanical and electrical forms, enabling information handling system 120 to receive the signals from a telemetry sub, on bottom-hole assembly 118, and conversely, transmit a downlink signal to the telemetry sub on bottom-hole assembly 118. In any embodiment, the transducer may be located at the surface and/or any part of drillstring 114 (e.g., as part of bottom-hole assembly 118).

Drill bit 124 is a machine which may be used to cut through, scrape, and/or crush (i.e., break apart) materials in the ground (e.g., rocks, dirt, clay, etc.). Drill bit 124 may be disposed at the frontmost point of drillstring 114 and bottom-hole assembly 118. In any embodiment, drill bit 124 may include one or more cutting edges (e.g., hardened metal points, surfaces, blades, protrusions, etc.) to form a geometry which aids in breaking ground materials loose and further crushing that material into smaller sizes. In any embodiment, drill bit 124 may be rotated and forced into (i.e., pushed against) the ground material to cause the cutting, scraping, and crushing action. The rotations of drill bit 124 may be caused by top drive 110 and/or one or more motor(s) located on drillstring 114 (e.g., on bottom-hole assembly 118).

Pump 128 is a machine that may be used to circulate drilling fluid 130 from a reservoir, through a feed pipe, to derrick 104, to the interior of drillstring 114, out through drill bit 124 (through orifices, not shown), back upward through borehole 116 (around drillstring 114), and back into the reservoir. In any embodiment, any appropriate pump 128 may be used (e.g., centrifugal, gear, etc.) which is powered by any suitable means (e.g., electricity, combustible fuel, etc.).

Drilling fluid 130 is a liquid which may be pumped through drillstring 114 and borehole 116 to collect drill cuttings, debris, and/or other ground material from the end of borehole 116 (e.g., the volume most recently hollowed by drill bit 124). Further, drilling fluid 130 may provide conductive cooling to drill bit 124 (and/or bottom-hole assembly 118). In any embodiment, drilling fluid 130 may be circulated via pump 128 and filtered to remove unwanted debris.

During drilling operations, bottom-hole assembly may comprise, at least in part, a pulsed neutron logging tool 132. This may allow for logging while drilling operations to be performed. Measurements taken by pulsed neutron logging tool 132 may be gathered and/or processed by information handling system 120. For example, measurements taken by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on and/or near pulsed neutron logging tool 132 or may occur both downhole and at surface. Information handling system 120 may process the signals, and the information contained therein may be displayed for an operator to observe and stored for future processing and reference. Information handling system 120 may also contain an apparatus for supplying control signals and power to pulsed neutron logging tool 132. Although illustrated as disposed on bottom-hole assembly 118 in a drilling operation, pulsed neutron logging tool 132 may also be disposed in borehole 116 in a wireline operation. Moreover, as mentioned, pulsed neutron logging tool 132 can have a scintillator detector having a scintillator (scintillation crystal) that is or includes $CeBr_3$.

Figure 2:
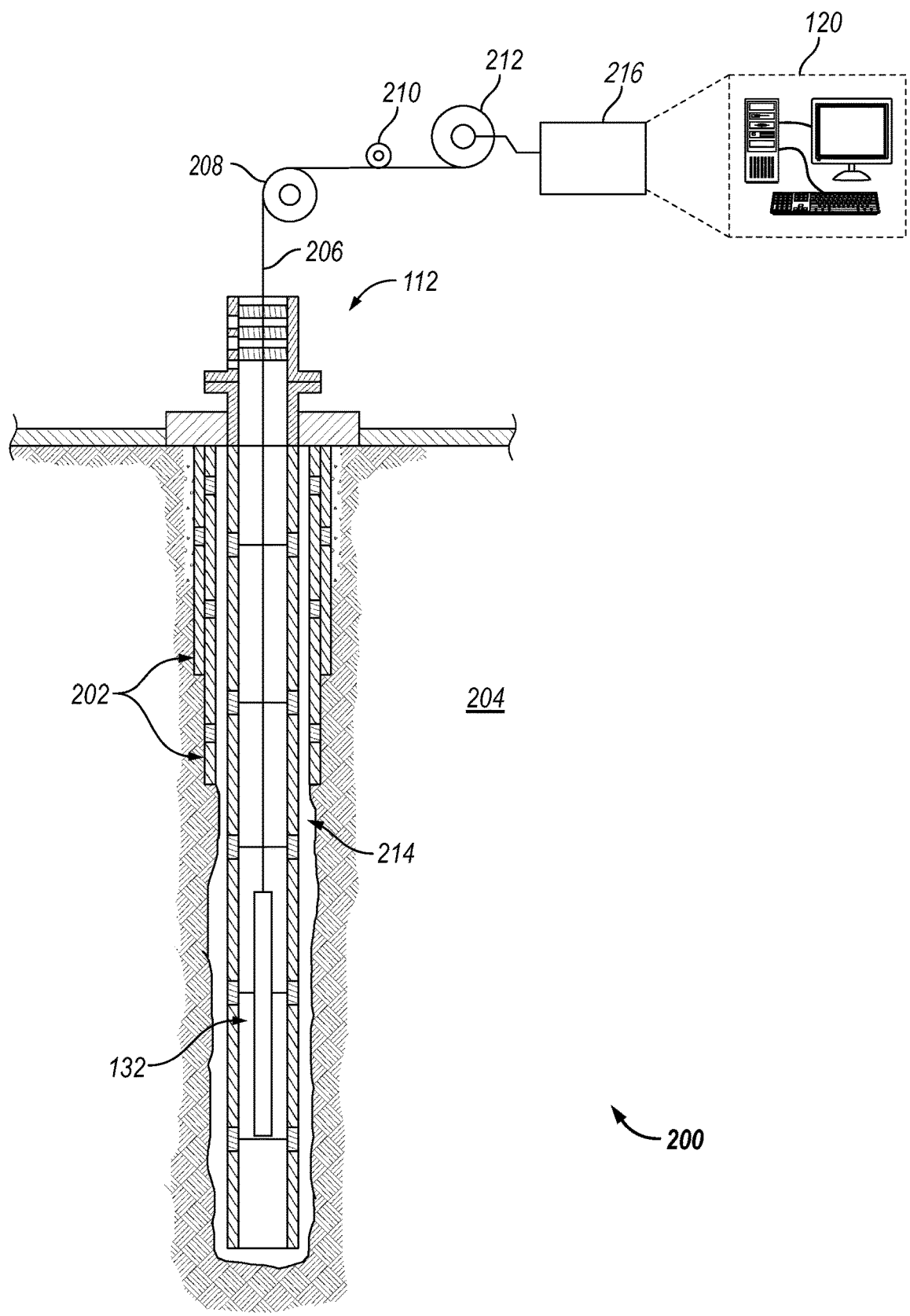
FIG. 2 illustrates the pulsed neutron logging tool in a wireline operation, in accordance with examples of the present disclosure.

FIG. 2 illustrates a wireline operation 200, as disclosed herein, utilizing a pulsed neutron logging tool 132. Pulsed neutron logging tool 132 can have a scintillator detector in which the scintillator may be or include $CeBr_3$. FIG. 2 illustrates a cross-section of borehole 116 with a pulsed neutron logging tool 132 traveling through casing string 202. Borehole 116 may traverse through subterranean formation 204 as a vertical well and/or a horizontal well. Pulsed neutron logging tool 132 may be suspended by a conveyance 206, which communicates power from a logging center 208 to pulsed neutron logging tool 132 and communicates telemetry from pulsed neutron logging tool 132 to information handling system 120. In examples, pulsed neutron logging tool 132 may be operatively coupled to a conveyance 206 (e.g., wireline, slickline, coiled tubing, pipe, downhole tractor, and/or the like) which may provide mechanical suspension, as well as electrical connectivity, for pulsed neutron logging tool 132. Conveyance 206 and pulsed neutron logging tool 132 may extend within casing string 202 to a depth within borehole 116. Conveyance 206, which may include one or more electrical conductors, may exit wellhead 112, may pass around pulley 208, may engage odometer 210, and may be reeled onto winch 212, which may be employed to raise and lower the tool assembly in borehole 116. Wellhead 112 may allow for entry into borehole 116 and placement of pulsed neutron logging tool 132 into pipe string 214. The position of pulsed neutron logging tool 132 may be monitored in a number of ways, including an inertial tracker in pulsed neutron logging tool 132 and a paid-out conveyance length monitor in logging facility 208.

Multiple such measurements may be desirable to enable the system to compensate for varying cable tension and cable stretch due to other factors. Information handling system 120 in logging facility 208 collects telemetry and position measurements and provides position-dependent logs of measurements from pulsed neutron logging tool 132 and values that may be derived therefrom.

Pulsed neutron logging tool 132 generally includes multiple instruments for measuring a variety of downhole parameters. Wheels, bow springs, fins, pads, or other centralizing mechanisms may be employed to keep pulsed neutron logging tool 132 near the borehole axis during measurement operations. During measurement operations, generally, measurements may be performed as pulsed neutron logging tool 132 is drawn up hole at a constant rate. The parameters and instruments may vary depending on the needs of the measurement operation.

Measurements taken by pulsed neutron logging tool 132 may be gathered and/or processed by information handling system 120. For example, signals recorded by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on pulsed neutron logging tool 132 or may occur both downhole and at surface. In some examples, signals recorded by pulsed neutron logging tool 132 may be conducted to information handling system 120 by way of conveyance 206. Information handling system 120 may process the signals, and the information contained therein may be displayed for an operator to observe and stored for future processing and reference. Information handling system 120 may also contain an apparatus for supplying control signals and power to pulsed neutron logging tool 132.

In wireline operations 200, a digital telemetry system may be employed, wherein an electrical circuit may be used to both supply power to pulsed neutron logging tool 132 and to transfer data between information handling system 120 and pulsed neutron logging tool 132. A DC voltage may be provided to pulsed neutron logging tool 132 by a power supply located above ground level, and data may be coupled to the DC power conductor by a baseband current pulse system. Alternatively, pulsed neutron logging tool 132 may be powered by batteries located within the downhole tool assembly, and/or the data provided by pulsed neutron logging tool 132 may be stored within the downhole tool assembly, rather than transmitted to the surface during logging.

Figure 3:
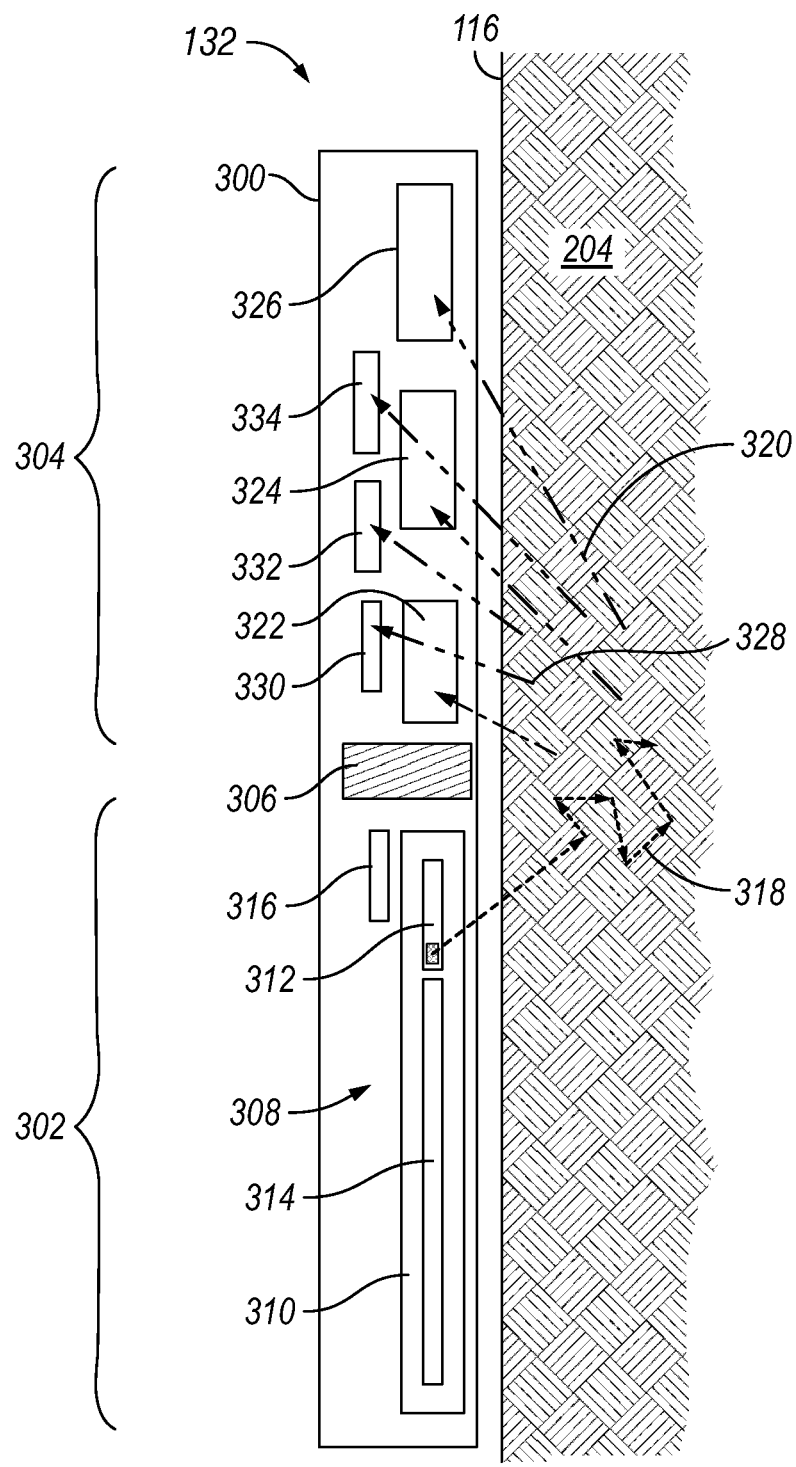
FIG. 3 is a diagram of illustrative embodiments of a pulsed neutron logging tool.

FIG. 3 illustrates pulsed neutron logging tool 132 disposed in borehole 116. It should be noted, as discussed above, that pulsed neutron logging tool 132 may be disposed on a bottom-hole assembly 118 (e.g., referring to FIG. 1) in a logging while drilling operation or utilized in a wireline operation (e.g., referring to FIG. 2). Additionally, the orientation of pulsed neutron logging tool 132, whether the generator is disposed above or below the detectors, is inconsequential.

With continued reference to FIG. 3, pulsed neutron logging tool 132 may comprise an outer housing 300 which may be formed from a heavy metal such as steel, or Inconel, for example. Housing 300 may protect the internal devices of pulsed neutron logging tool 132 from the downhole environment that pulsed neutron logging tool 132 may experience in borehole 116. As illustrated, pulsed neutron logging tool 132 may be divided into a generation area 302 and a detection area 304 that are separated by shielding 306. From generation area 302, neutrons may be generated and broadcasted into formation 204 (referring to FIG. 2). Detection area 304 may be operated and function to detect gamma rays that may originate from formation 204 naturally or induced by the broadcast of neutrons into formation 204.

Generation area 302 may comprise a pulsed neutron generator 308 that may be packaged within $SF_6$ housing 310. $SF_6$ housing 310 may be comprised of a heavy metal like stainless steel, for example. As noted above, within $SF_6$ housing 310 may be a pulsed neutron generator 308 that may further comprise a neutron tube 312, which generates neutrons for broadcasting, and a high voltage (HV) ladder power supply 314 that may be utilized to power neutron tube 312. In other examples, pulsed neutron generator 308 may be replaced with a continuous neutron source such as Americium-Beryllium (Am—Be) chemical source. Outside of $SF_6$ housing 310 may be a fast neutron monitor 316, that may be utilized to monitor the broadcasting of neutrons 318 from generation area 302 into formation 204. For example, during operations pulsed neutron logging tool 132 may generate pulses of high energy neutrons that radiate from pulsed neutron generator 308 into the surrounding environment including borehole 116 and formation 204. The highly energetic neutrons 318 entering the surrounding environment interact with atomic nuclei, inducing gamma ray radiation. Induced inelastic and capture gamma rays 320 and thermal neutrons 328 may be sensed and recorded by detection area 304. The scattered neutrons and gamma ray spectrum may be measured to determine properties of borehole 116 and formation 204. Through processing, the measurements may be utilized to identify oil and gas in formation 204 as well as determining the flow in production wells. As illustrated, neutrons 318 may be broadcasted into formation 204, wherein neutrons 318 may interact with material within formation 204 to create inelastic gamma rays 320, discussed in greater detail below. Inelastic and capture gamma rays 320 may be detected, sensed, and/or measured by devices within detection area 304 of pulsed neutron logging tool 132.

Detection area 304 may comprise a number of devices that may be utilized to detect, sense, and/or measure inelastic and capture gamma rays 320. As illustrated, a number of gamma ray scintillator detectors may be utilized, which implement a scintillation crystal coupled to a photomultiplier tube. In examples, gamma ray scintillator detectors may be identified as a near gamma ray scintillator detector 322, a far gamma ray scintillator detector 324, and a long gamma ray scintillator detector 326. Identification of each scintillator detector as near, far, and long is due to the distance from neutron generator 308. For example, the closest scintillator detector to neutron generator 308 is "near," the second closest is "far", and the third closest is "long." This nomenclature may also be utilized for thermal neutron detectors that may also be disposed within detection area 304 and may operate and function to detect thermal neutrons 328 that may originate from formation 204 during the interaction of neutrons 318 with material within formation 204. For example, neutron detectors may operate and function to count thermal (around about 0.025 eV) and/or epithermal (between about 0.1 eV and 100 eV) neutrons. Suitable neutron detectors include Helium-3 (He-3) filled proportional counters, though other neutron counters may also be used. Thus, within detection area 304 may be a near thermal neutron detector 330, a far thermal neutron detector 332, and a long thermal neutron detector 334. As noted above, detection area 304 may be separated from generation area 302 by shielding 306.

Shielding 306 may be a structure formed of a heavy metal such as tungsten, for example. This material may operate and function to prevent neutrons 318 that may be generated from pulsed neutron generator 308 from being detected by the detectors in detection area 304. Without shielding 306, neutrons 318 generated from pulsed neutron generator 308 may saturate all detectors within detection area 304 and prevent the detection and measurement of gamma rays and neutrons from formation 204.

FIGS. 4A-4D illustrate different embodiments of pulsed neutron logging tool 132. FIG. 4A illustrates an embodiment shown in FIG. 3. In this embodiment, the distance from pulsed neutron generator 308 to near thermal neutron detector 330 is $D_{n1}$, to far thermal neutron detector 332 is $D_{n2}$, and to long thermal neutron detector 334 is $D_{n3}$. Further, the distance from pulsed neutron generator 308 to near gamma ray scintillator detector 322 is $D_{y1}$, a far gamma ray scintillator detector 324 is $D_{y2}$, and a long gamma ray scintillator detector 326 is $D_{y3}$. FIG. 4B illustrates another embodiment in which the distances $D_{n1}$, $D_{n2}$, $D_{n3}$ from pulsed neutron generator 308 to each thermal neutron detector 330, 332, 334 have changed as each thermal neutron detector is now disposed within generation area 302. FIG. 4C illustrates an embodiment where only thermal neutron detectors 330, 332, 334 with distances $D_{n1}$, $D_{n2}$, $D_{n3}$ are utilized and FIG. 4D illustrates an embodiment where only gamma ray scintillator detectors 322, 324, and 326 distances $D_{y1}$, $D_{y2}$, $D_{y3}$ are utilized.

Multiple detectors of pulsed neutron logging tool 132, may enable pulsed neutron logging tool 132 to measure properties of formation 204 and borehole 116 (e.g., referring to FIG. 3) using any of the existing multiple-spacing techniques. In addition, the presence of gamma ray detectors which have proper distances from pulsed neutron generator 308, may enable the measurement of elemental gamma ray spectroscopy.

As discussed above, during measurement operations, neutrons 318 (e.g., referring to FIG. 3) emitted from neutron source or pulsed neutron generator 308 undergo neutron scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. During interactions, the elastic cross section is nearly constant, whereas the inelastic scattering cross section and absorption cross sections are proportional to the reciprocal of the neutron speed. For example, inelastic scatterings appear for fast neutrons in the MeV energy range, whereas absorptions happen when neutrons slowed down in the eV energy range.

Figure 5:
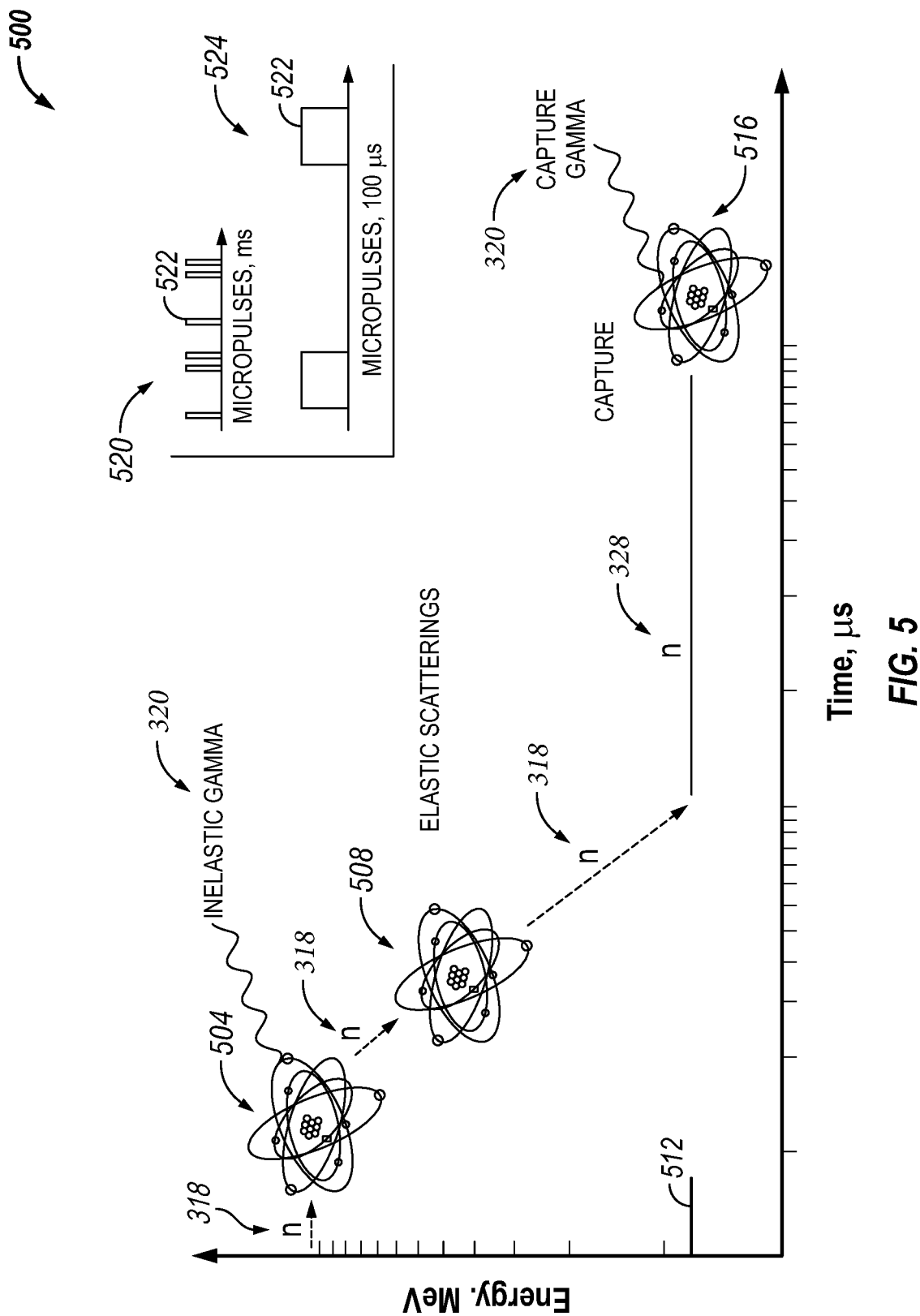
FIG. 5 illustrates the energy of a neutron as it interacts in the present disclosure.

FIG. 5 illustrates a graph 500 that depicts different scattering by a neutron 318. As illustrated, neutron 318 may be traveling at a fast speed with high kinetic energy and interacts with nuclei 504, releasing inelastic gamma ray 320 and lowering the energy state of neutron 318. After the interaction, neutron 318 contains too much energy to be absorbed, thus continuing its path until it interacts with nuclei 508 releasing inelastic gamma ray 320 and again lowering its energy state again. After the interaction, neutron 318 has kinetic energy close to target energy 512, becomes a thermal neutron 328. Thus, when neutron 328 at target energy 512 interacts with nuclei 514 it will be captured. This interaction results in a rearranged nucleus 516 containing previously traveling neutron 328 and an emitted capture gamma 320. Sensing these events with pulsed neutron logging tool 132 using detection area 304 may allow for the identification of oil, gas, and/or water in borehole 116 and formation 204 (e.g., referring to FIG. 3).

With continued reference to FIG. 5, the neutron to gamma ray timing information may be utilized during measurement operations in which a pulsing neutron generator is utilized. In a sub-µs time domain, inelastic gamma rays dominate, whereas in a 10-1000 us time range, gamma rays are captured. Insert 520 on FIG. 5 illustrates an example of neutron pulses 522 train and insert 524 shows the relationship of two adjacent neutron pulses 522 with a given pulse width and timing interval. Pulsing schemes allow isolation of inelastic and capture gamma rays 320, and then allow elemental determinations of different nuclei in the bore hole, formation, or fluids.

During measurement operations, pulsed neutron logging tool 132 may take any number of measurements of inelastic and capture gamma rays 320 and/or thermal neutrons 328 (e.g., referring to FIG. 3). These measurements may be further processed by additional methods and systems that may utilize information handling system 120.

Figure 6:
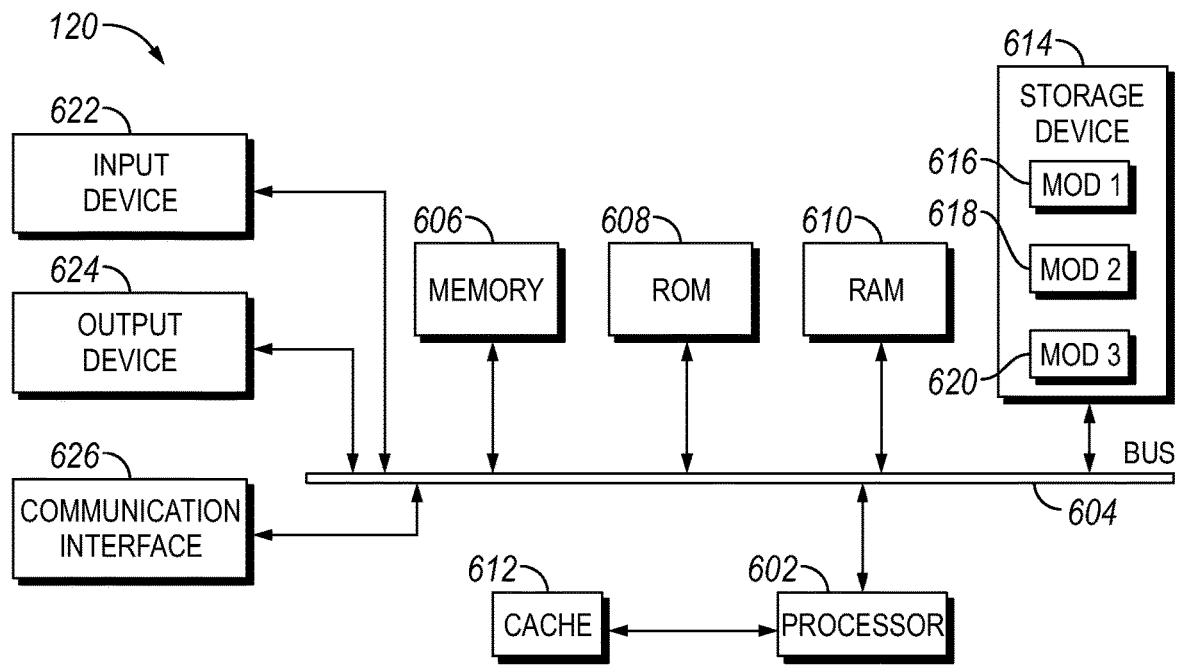
FIG. 6 illustrates a schematic of an information handling system.

FIG. 6 further illustrates an example information handling system 120 which may be employed to perform various steps, methods, and techniques disclosed herein. Persons of ordinary skill in the art will readily appreciate that other system examples are possible. As illustrated, information handling system 120 includes a processing unit (CPU or processor) 602 and a system bus 604 that couples various system components including system memory 606 such as read only memory (ROM) 608 and random-access memory (RAM) 610 to processor 602. Processors disclosed herein may all be forms of this processor 602. Information handling system 120 may include a cache 612 of high-speed memory connected directly with, in close proximity to, or integrated as part of processor 602. Information handling system 120 copies data from memory 606 and/or storage device 614 (written 514 in FIG. 6) to cache 612 for quick access by processor 602. In this way, cache 612 provides a performance boost that avoids processor 602 delays while waiting for data. These and other modules may control or be configured to control processor 602 to perform various operations or actions. Other system memory 606 may be available for use as well. Memory 606 may include multiple different types of memory with different performance characteristics. It may be appreciated that the disclosure may operate on information handling system 120 with more than one processor 602 or on a group or cluster of computing devices networked together to provide greater processing capability. Processor 602 may include any general-purpose processor and a hardware module or software module, such as first module 616, second module 618, and third module 620 stored in storage device 614, configured to control processor 602 as well as a special-purpose processor where software instructions are incorporated into processor 602. Processor 602 may be a self-contained computing system, containing multiple cores or processors, a bus, memory controller, cache, etc. A multi-core processor may be symmetric or asymmetric. Processor 602 may include multiple processors, such as a system having multiple, physically separate processors in different sockets, or a system having multiple processor cores on a single physical chip. Similarly, processor 602 may include multiple distributed processors located in multiple separate computing devices but working together such as via a communications network. Multiple processors or processor cores may share resources such as memory 606 or cache 612 or may operate using independent resources. Processor 602 may include one or more state machines, an application specific integrated circuit (ASIC), or a programmable gate array (PGA) including a field PGA (FPGA).

Each individual component discussed above may be coupled to system bus 604, which may connect each and every individual component to each other. System bus 604 may be any of several types of bus structures including a memory bus or memory controller, a peripheral bus, and a local bus using any of a variety of bus architectures. A basic input/output (BIOS) stored in ROM 608 or the like, may provide the basic routine that helps to transfer information between elements within information handling system 120, such as during start-up. Information handling system 120 further includes storage devices 614 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 614 may include software modules 616, 618, and 620 for controlling processor 602. Information handling system 120 may include other hardware or software modules. Storage device 614 is connected to the system bus 604 by a drive interface. The drives and the associated computer-readable storage devices provide nonvolatile storage of computer-readable instructions, data structures, program modules and other data for information handling system 120. In one aspect, a hardware module that performs a particular function includes the software component stored in a tangible computer-readable storage device in connection with hardware components, such as processor 602, system bus 604, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 120 is a small, handheld computing device, a desktop computer, or a computer server.

When processor 602 executes instructions to perform "operations", processor 602 may perform the operations directly and/or facilitate, direct, or cooperate with another device or component to perform the operations.

As illustrated, information handling system 120 employs storage device 614, which may be a hard disk or other types of computer-readable storage devices which may store data that are accessible by a computer, such as magnetic cassettes, flash memory cards, digital versatile disks (DVDs), cartridges, random access memories (RAMs) 610, read only memory (ROM) 608, a cable containing a bit stream and the like, which may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 120, an input device 622 represents any number of input mechanisms, such as a microphone for speech, a touch-sensitive screen for gesture or graphical input, keyboard, mouse, motion input, speech and so forth. Additionally, input device 622 may receive one or more measurements from bottom-hole assembly 118 (e.g., referring to FIG. 1), discussed above. An output device 624 may also be one or more of a number of output mechanisms known to those of skill in the art. In some instances, multimodal systems enable a user to provide multiple types of input to communicate with information handling system 120. Communications interface 626 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 602, that is purpose-built to operate as an equivalent to software executing on a general purpose processor. For example, the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 608 for storing software performing the operations described below, and random-access memory (RAM) 610 for storing results. Very large-scale integration (VLSI) hardware embodiments, as well as custom VLSI circuitry in combination with a general-purpose DSP circuit, may also be provided.

Figure 7:
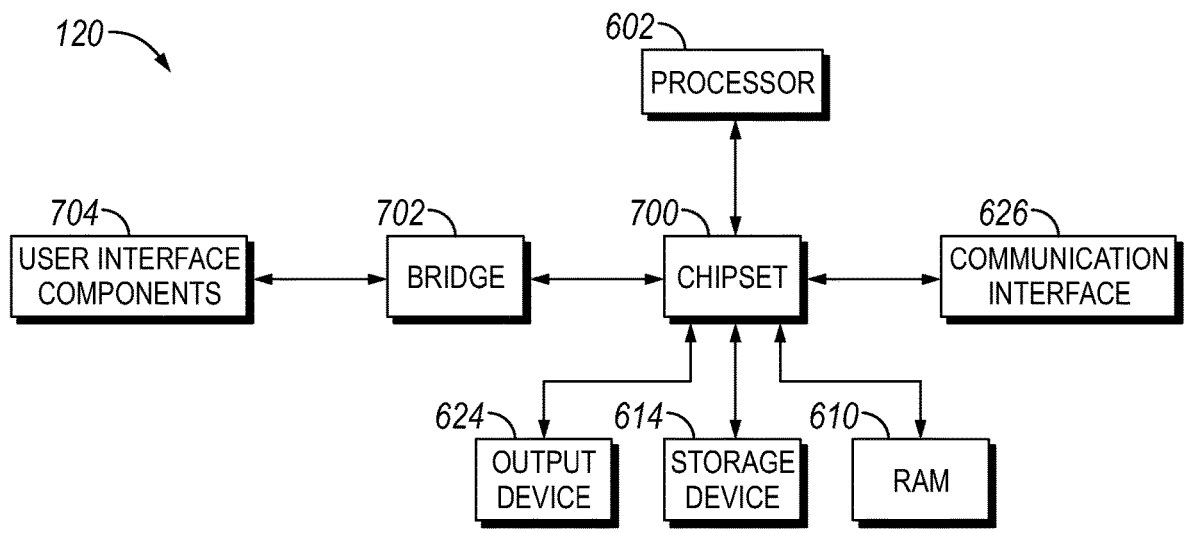
FIG. 7 illustrates a schematic of a chip set.

FIG. 7 illustrates an example information handling system 120 having a chipset architecture that may be used in executing the described method and generating and displaying a graphical user interface (GUI). Information handling system 120 is an example of computer hardware, software, and firmware that may be used to implement the disclosed technology. Information handling system 120 may include a processor 602, representative of any number of physically and/or logically distinct resources capable of executing software, firmware, and hardware configured to perform identified computations. Processor 602 may communicate with a chipset 700 that may control input to and output from processor 602. In this example, chipset 700 outputs information to output device 624, such as a display, and may read and write information to storage device 614, which may include, for example, magnetic media, and solid-state media. Chipset 700 may also read data from and write data to RAM 610. A bridge 702 for interfacing with a variety of user interface components 704 may be provided for interfacing with chipset 700. Such user interface components 704 may include a keyboard, a microphone, touch detection and processing circuitry, a pointing device, such as a mouse, and so on. In general, inputs to information handling system 120 may come from any of a variety of sources, machine generated and/or human generated.

Chipset 700 may also interface with one or more communication interfaces 626 that may have different physical interfaces. Such communication interfaces 626 may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 602 analyzing data stored in storage device 614 or RAM 610. Further, information handling system 120 receives inputs from a user via user interface components 704 and executes appropriate functions, such as browsing functions by interpreting these inputs using processor 602.

In examples, information handling system 120 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 8:
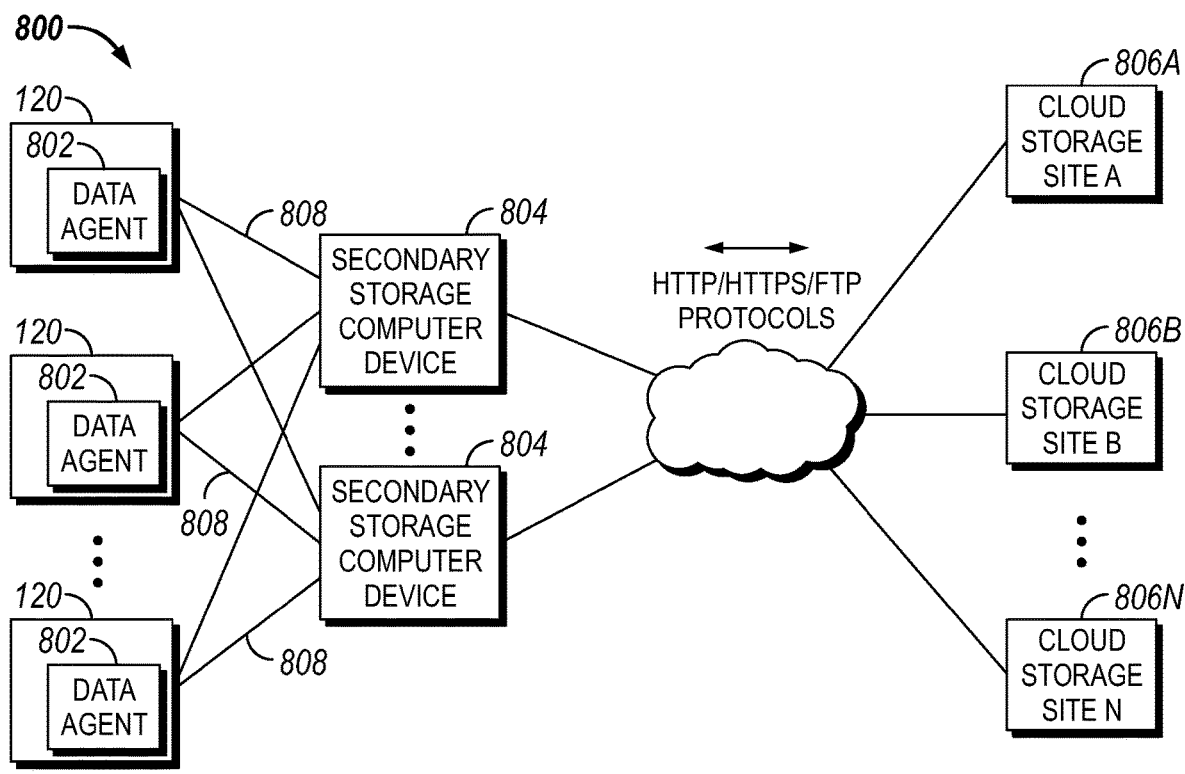
FIG. 8 illustrates a computing network.

FIG. 8 illustrates an example of one arrangement of resources in a computing network 800 that may employ the processes and techniques described herein, although many others are of course possible. As noted above, an information handling system 120, as part of their function, may utilize data, which includes files, directories, metadata (e.g., access control list (ACLS) creation/edit dates associated with the data, etc.), and other data objects. The data on the information handling system 120 is typically a primary copy (e.g., a production copy). During a copy, backup, archive or other storage operation, information handling system 120 may send a copy of some data objects (or some components thereof) to a secondary storage computing device 804 by utilizing one or more data agents 802.

A data agent 802 may be a desktop application, website application, or any software-based application that is run on information handling system 120. As illustrated, information handling system 120 may be disposed at any rig site (e.g., referring to FIG. 1), off site location, or repair and manufacturing center. The data agent may communicate with a secondary storage computing device 804 using communication protocol 808 in a wired or wireless system. Communication protocol 808 may function and operate as an input to a website application. In the website application, field data related to pre- and post-operations, generated DTCs, notes, and the like may be uploaded. Additionally, information handling system 120 may utilize communication protocol 808 to access processed measurements, operations with similar DTCs, troubleshooting findings, historical run data, and/or the like. This information is accessed from secondary storage computing device 804 by data agent 802, which is loaded on information handling system 120.

Secondary storage computing device 804 may operate and function to create secondary copies of primary data objects (or some components thereof) in various cloud storage sites 806A-N. Additionally, secondary storage computing device 804 may run determinative algorithms on data uploaded from one or more information handling systems 120, discussed further below. Communications between the secondary storage computing devices 804 and cloud storage sites 806A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 806A-N, the secondary storage computing device 804 may also perform local content indexing and/or local object-level, sub-object-level or block-level deduplication when performing storage operations involving various cloud storage sites 806A-N. Cloud storage sites 806A-N may further record and maintain, EM logs, map DTC codes, store repair and maintenance data, store operational data, and/or provide outputs from determinative algorithms that are located in cloud storage sites 806A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principals and define the mathematical relationship of a system, a pure machine learning model may not be derived from first principals. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstitution, random subsampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 9:
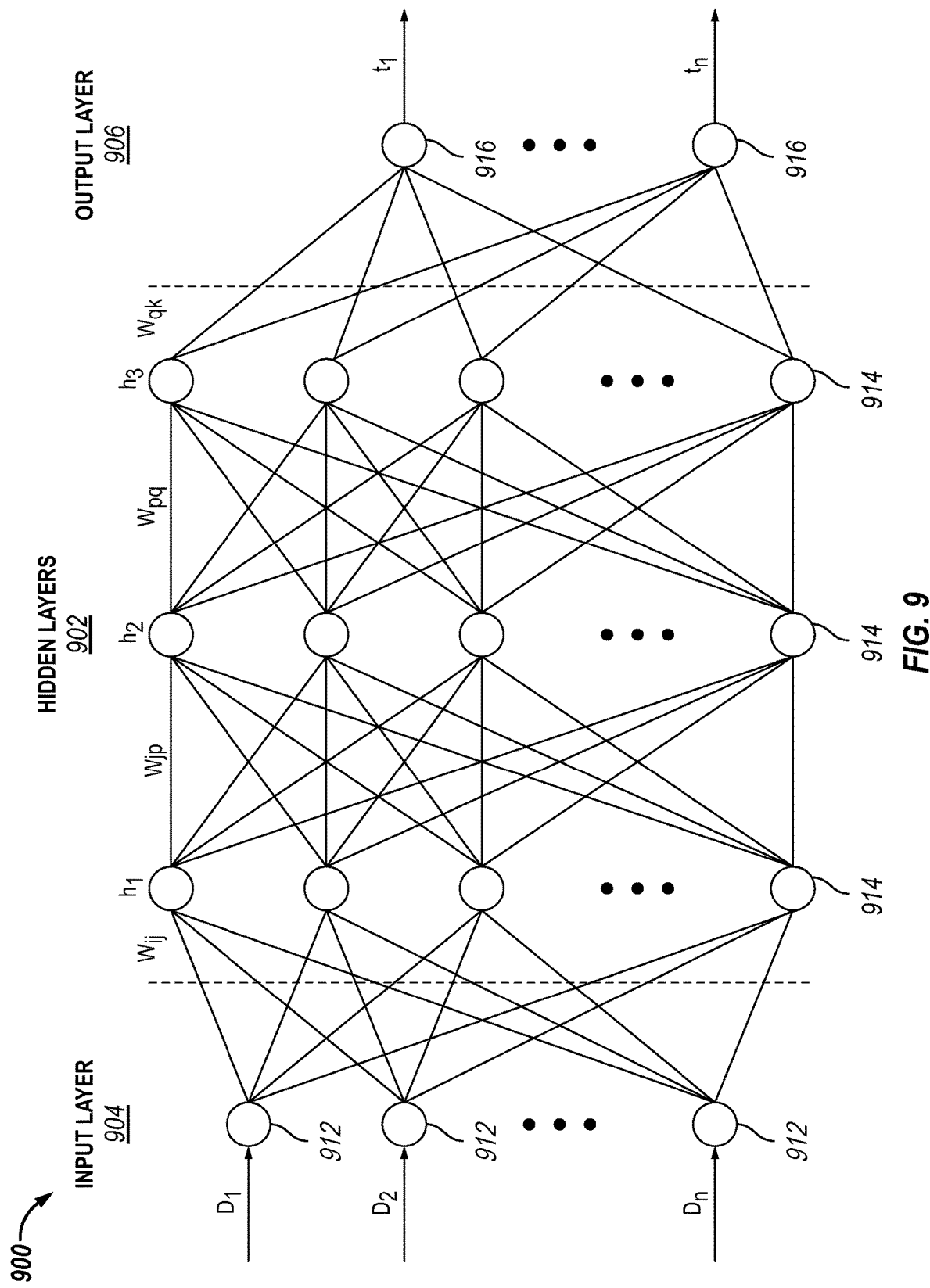
FIG. 9 illustrates a neural network.

FIG. 9 illustrates neural network (NN) 900. NN 900 may operate utilizing one or more information handling systems 120 (e.g., referring to FIG. 1) on computing network 900. Although a NN is illustrated, multiple models may be used with input output structures. These models may include flexible empirical models such as NN, gaussian processing methods, kriging methods, evolutionary methods such as genetic algorithms, classification methods, clustering methods empirical methods, or physics based methods such as equations of state, thermodynamic models, geological, geochemistry, or chemistry models, or kinetic models or any combinations therein including recursive combinations of similar or dissimilar models and iterative model combinations. A NN 900 is an artificial neural network with one or more hidden layers 902 between input layer 904 and output layer 906. In examples, NN 900 may be software on a single information handling system 120. In other examples, NN 900 may software running on multiple information handling systems 120 connected wirelessly and/or by a hard-wired connection in a network of multiple information handling systems 120. Herein, NN 900 may be applied in a wide array of implementations.

During operations, inputs 908 data are given to neurons 912 in input layer 904. Neurons 912, 914, and 916 are defined as individual or multiple information handling systems 120 connected in a computing network 800. The output from neurons 912 may be transferred to one or more neurons 914 within one or more hidden layers 902. Hidden layers 902 includes one or more neurons 914 connected in a network that further process information from neurons 912. The number of hidden layers 902 and neurons 912 in hidden layer 902 may be determined by personnel that designs NN 900. Hidden layers 902 is defined as a set of information handling system 120 assigned to specific processing. Hidden layers 902 spread computation to multiple neurons 912, which may allow for faster computing, processing, training, and learning by NN 900. Output from NN 900 may be computed by neurons 916. Information handling system 120 and the systems that may incorporate one or more information handling systems 120 (as described in FIGS. 8 and 9) may be utilized in processing techniques to extract elemental compositions of formation 204 (e.g., referring to FIG. 2) from measurements taken by pulsed neutron logging tool 132.

Pulsed neutron logging tool 132 (e.g., referring to FIGS. 1 and 2) uses neutron-induced gamma ray spectroscopy along with doping the borehole fluid within borehole 116 (e.g., referring to FIGS. 1 and 2) with a neutron absorber to remove at least part of the thermal neutrons 328 (e.g., referring to FIG. 3) without emitting capture gamma rays 320 within the spectral range of interest. Within generation area 302 of pulsed neutron logging tool 132, pulsed neutron generation 308 may emits neutrons 318 into the downhole environment and these neutrons 318 generate inelastic and capture gamma rays 320 including the borehole gamma rays and the formation gamma rays which are subsequently detected by pulsed neutron logging tool 132. However, only the formation gamma rays are of interest for determining the elemental composition of formation 204. Therefore, the borehole gamma rays constitute an undesired background. These borehole gamma rays can be from inelastic neutron scattering or thermal neutron capture. They can come from pulsed neutron logging tool 132, the borehole fluid, or naturally occurring gamma rays from borehole 116 or formation 204. The borehole fluid includes drilling fluids, water-based mud, oil-based mud, water, completion fluid, etc. One of the components of this undesired background that could be reduced significantly is the gamma ray signal from neutron capture in the borehole fluid. Lowering the undesired background improves accuracy and precision to formation elemental yields.

Pulsed neutron logging operations may involve analyzing neutron-induced gamma-ray spectra and extracting the elemental composition via an inversion process. Such a process could involve fitting the measured spectra to a linear combination of laboratory deduced elemental standards, or a machine learning approach, for example. These measurements allow for accurate definition of the clay content, mineralogy of the formation, and matrix properties of each measured zone. Some elements that are typically present in the borehole fluid, and will thus contribute to the background, include hydrogen (H), chloride (CI), barium (Ba), sulfur(S), and calcium (Ca). Carbon (C) and oxygen (O) are not included in this list because they do not show appreciable capture peaks within the energy range of interest. The typical energy range of interest runs from 0.511 MeV (matter/antimatter annihilation peak) to about 7.63 MeV (iron (Fe) capture peak). Virtually all of the peaks of interest are within this range. The annihilation peak at 0.511 MeV is always present in gamma ray spectra and is used for energy calibration. At slightly higher energies lie important elemental peaks such as the inelastic peak for iron (Fe) at 0.847 MeV, the inelastic peak for aluminum (Al) at 1.01 MeV, the inelastic peak for magnesium (Mg) at 1.37 MeV, the inelastic peak for silicon (Si) at 1.78 MeV, the peak for capture calcium (Ca) at 1.94 MeV, the peak for capture hydrogen (H) at 2.22 MeV, the peak for capture silicon (Si) at 3.54 MeV, the inelastic peak for carbon (C) at 4.44 MeV, the second peak for capture Si at 4.93 MeV, the inelastic peak for oxygen (O) at 6.13 MeV, the second peak for capture Ca at 6.42 MeV, the peak for capture Fe at 7.63 MeV, for example. Lithologic fractions of total clay, total carbonate, quartz, feldspar, and mica are derived from the concentrations of silicon, calcium, and iron. Matrix density is calculated from silicon, calcium, iron, and sulfur, and it is combined with the measured bulk density to derive an accurate total porosity.

In embodiments, background borehole gamma rays are removed from thermal neutron capture of the borehole fluid. The undesired captured background is removed by doping the borehole fluid with a strong neutron absorber that does not produce gamma rays in the spectral range of interest (E>0.5 MeV). In this manner, neutrons 318 may be absorbed before they can be captured on a borehole fluid element and produce background inside the energy range of interest. For example, the boron isotope B-10 is a great candidate for a dopant because of its high neutron absorption cross section and its lack of any absorption of gamma rays above 0.5 MeV, which would generally constitute the energy region of interest. Another candidate can be one of the isotopes of lithium such as Li-6, for example. Like B-10, Li-6 also produces no gamma rays at all in the region of interest. However, the cross section for absorption of neutron for Li-6 is four times lower than the cross section for neutron absorption for B-10. Another hypothetical dopant is He-3. The thermal neutron absorption cross section of He-3 is larger than both B-10 and Li-6, and it does not produce any gamma rays. However, mixing He-3 with mud may be problematic sometime as He is unreactive and forms no known compounds. Adding other known "neutron poisons" like Gd-157, Cd-113, Sm-149, and Xe-135 would successfully absorb neutrons. However, they may also produce gamma rays in the energy region of interest. In order to avoid gamma ray production in the energy region of interest, low mass neutron absorbing isotopes may be considered such as He-3, Li-6, and B-10, for example.

Figure 10:
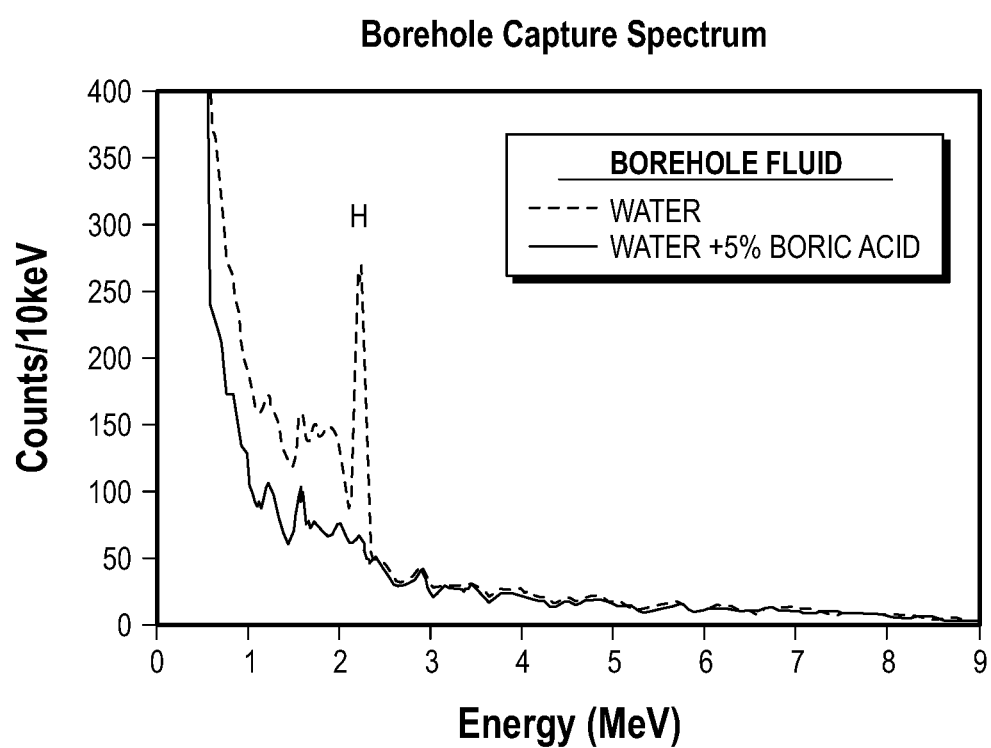
FIG. 10 illustrates a simulated borehole capture spectrum (borehole fluid+tool) for a logging while drilling (LWD) geochemical logging tool sitting inside a laboratory formation as compared with a borehole fluid doped with isotope B-10 according to embodiments of the present disclosure.

FIG. 10 is an example of spectra taken with a borehole fluid as compared with a borehole fluid doped with isotope B-10. FIG. 10 is a Monte Carlo N-Particle Transport (MCNP) simulated borehole capture spectrum (borehole fluid+tool) for a logging while drilling (LWD) pulsed neutron logging tool 132 sitting inside a laboratory formation. There are two spectra represented in FIG. 10. The first spectrum represents the simulated borehole capture spectrum of pure water. The second spectrum is the simulated borehole capture spectrum of water after adding 5% by mass of boric acid enriched with isotope B-10. The resulting water has a concentration of isotope B-10 of 0.8% by mass. The addition of 5% boric acid eliminates the H peak from the $1^{st}$ spectrum.

There are other isotopes that can be good candidates as dopants. For example, Gd-157 and Cd-113 have very high neutron absorption cross sections. However, these isotopes produce naturally occurring gamma rays with an energy higher than 0.5 MeV upon neutron absorption. Any candidates should be strongly absorbing isotopes which produce no, or very little, or at least predictable gamma radiation above 0.5 MeV. The potential isotope candidates should not preferably produce gamma rays above 0.5 MeV. However, the nature of their background spectrum should also be benign (i.e. a smooth background with no peaks) and thus of interest for reducing peak background (although not continuum background). Alternatively, their peak background should not interfere with the peaks due to the elemental composition of the formation and should be predictable and/or consistent.

In embodiments, methods to determine isotope candidates and their proper concentration include placing pulsed neutron logging tool 132 in borehole 116 (e.g., referring to FIG. 3) in a zero-porosity laboratory formation such as quartz or marble, for example. Then, fill borehole 116 with a borehole fluid of interest such as drilling fluid, water, brine, completion fluid, or any combination, for example. Then, running the pulsed neutron logging tool 132 and observing any gamma ray peaks resulting from any neutron capture, as described above, from the borehole fluid elements present in the borehole fluid of interest, such as the peak at 2.22 MeV from hydrogen, for example. Then, introducing a small amount of a dopant candidate such as boron isotope B-10, for example, and monitoring any changes in the acquired spectra. If the peaks disappear at the first introduction of dopant, that means the concentration is too high. After decreasing the dopant concentration by a factor of 10, look for the peaks again. If no peaks are seen, continue to decrease by a factor of 10 until the peak(s) appear(s) again. If the peaks are present, start increasing the dopant concentration in small steps until the peaks disappear. The optimum concentration should be used for large scale operation.

Alternatively, strong neutron absorbers which do produce gamma rays in the region of interest, but with limited range, and/or a spectrum with a smooth "benign" shape that does not interfere with important peaks, could be used. Possible examples of strong neutron absorbers include Cd-113 or Gd-157, which are both very strong neutron absorbers (much stronger than B-10) but have gamma ray spectra that may or may not be a problem for a given application as their respective peaks may interfere with the peaks from the targeted component. However, these strong neutron absorbers could be used if their spectra can be predicted and distinguished from the target analyte spectrum in a data processing stage.

The systems and methods may comprise any of the various features disclosed herein, comprising one or more of the following statements.

Statement 1. A method for determining an elemental composition of a downhole formation, comprising: adding a dopant to a borehole fluid, wherein the dopant comprises at least one neutron absorber; lowering a logging tool comprising a neutron-induced gamma ray spectrometer; emitting neutrons into a downhole environment; generating gamma rays comprising borehole gamma rays and formation gamma rays; detecting gamma rays from the downhole formation; and extracting the elemental composition of the downhole formation.

Statement 2. The method of Statement 1, wherein the dopant absorbs at least part of the thermal neutrons in the borehole fluid.

Statement 3. The method of Statement 1 or Statement 2, wherein the dopant does not emit gamma rays above 0.5 MeV.

Statement 4. The method of any of Statements 1 to 3, wherein the dopant has a high neutron absorption cross-section.

Statement 5. The method of any of Statements 1 to 4, wherein the borehole gamma rays are not detected by the neutron-induced gamma ray spectrometer.

Statement 6. The method of any of Statements 1 to 5, wherein the dopant is selected from the group of dopants consisting of B-10, Li-6, He-3, and any combination thereof.

Statement 7. The method of any of Statements 1 to 6, wherein the dopant is selected from the group of dopants consisting of Gd-157, Cd-113, Sm-149, Xe-135 and any combination thereof.

Statement 8. The method of any of Statements 1 to 7, wherein extracting the elemental composition of the downhole formation comprises analyzing neutron-induced gamma-ray spectra and extracting the elemental composition via an inversion process.

Statement 9. The method of any of Statements 1 to 8, wherein extracting the elemental composition of the downhole formation comprises fitting the measured neutron-induced gamma-ray spectra to a linear combination of laboratory deduced elemental standards.

Statement 10. The method of any of Statements 1 to 9, wherein extracting the elemental composition of the downhole formation comprises a machine learning approach.

Statement 11. The method of any of Statements 1 to 10, further determining the downhole formation clay content.

Statement 12. The method of any of Statements 1 to 11, further determining the downhole formation mineralogy and matrix properties.

Statement 13. The method of any of Statements 1 to 12, wherein the dopant produces a predictable gamma radiation above 0.5 MeV.

Statement 14. The method of any of Statements 1 to 13, wherein the dopant produces a background spectrum due to its gamma radiation above 0.5 MeV that does not interfere with the spectrum due to the elemental composition of the downhole formation.

Statement 15. The method of any of Statements 1 to 15, wherein extracting the elemental composition of the downhole formation comprises removing a background spectrum due to the dopant, wherein the dopant produces a predictable gamma radiation above 0.5 MeV.

Statement 16. The method of any of Statements 1 to 16, wherein the borehole fluid comprises drilling fluid, water, brine, completion fluid, wellbore fluid treatment, or any combination thereof.

Statement 17. A system to determine an elemental composition of a downhole formation comprising: a dopant to a borehole fluid, wherein the dopant comprises at least one neutron absorber; and a pulsed neutron logging tool comprising a generation area and a detection area separated by a shield, wherein the generation area comprises a pulsed neutron generator packaged in a housing, wherein the pulsed neutron generator comprises a neutron tube and a high voltage ladder power supply, wherein the detection area comprises a near gamma ray scintillator detector, a far gamma ray scintillator detector, and a long gamma ray scintillator detector, and a shielding formed of a heavy metal.

Statement 18. The system of Statement 17, wherein the detection area comprises a gamma ray detector and a near thermal neutron detector located side-by-side at the same distance from the pulsed neutron generator.

Statement 19. The system of Statement 17 or Statement 18, wherein the detection area comprises a gamma ray detector and a far thermal neutron detector located side-by-side at the same distance from the pulsed neutron generator.

Statement 20. The system of any of Statements 17-19, wherein the pulsed neutron generator is replaced by a continuous neutron source.

As it is impracticable to disclose every conceivable embodiment of the technology described herein, the figures, examples, and description provided herein disclose only a limited number of potential embodiments. One of ordinary skills in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skills in the art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment-which may be implemented in addition to, in conjunction with, or in place of an embodiment of a similarly-named component described for any other figure.

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" may be used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

What is claimed is:

1. A method for determining an elemental composition of a downhole formation, comprising:
    adding a dopant to a borehole fluid, wherein the borehole fluid is disposed in a borehole, and wherein the dopant comprises at least one neutron absorber;
    lowering a logging tool comprising a neutron-induced gamma ray spectrometer;
    emitting a plurality of neutrons into a downhole environment, that generate formation gamma rays in the downhole formation, and wherein at least a part of any of the plurality of neutrons emitted into the borehole are absorbed by the dopant which prevents at least in part one or more borehole gamma rays from being formed in the borehole;
    detecting gamma rays from the downhole formation; and
    extracting the elemental composition of the downhole formation form the gamma rays.

2. The method of claim 1, wherein the dopant absorbs at least some thermal neutrons in the borehole fluid.

3. The method of claim 1, wherein the dopant does not emit gamma rays above 0.5 MeV.

4. The method of claim 1, wherein the dopant has a high neutron absorption cross-section.

5. The method of claim 1, wherein the borehole gamma rays are not detected by the neutron-induced gamma ray spectrometer.

6. The method of claim 1, wherein the dopant is selected from a group of dopants consisting of B-10, Li-6, He-3, and any combination thereof.

7. The method of claim 1, wherein the dopant is selected from a group of dopants consisting of Gd-157, Cd-113, Sm-149, Xe-135 and any combination thereof.

8. The method of claim 1, wherein extracting the elemental composition of the downhole formation comprises analyzing neutron-induced gamma-ray spectra and extracting the elemental composition via an inversion process.

9. The method of claim 1, wherein extracting the elemental composition of the downhole formation comprises fitting measured neutron-induced gamma-ray spectra to a linear combination of laboratory deduced elemental standards.

10. The method of claim 1, wherein extracting the elemental composition of the downhole formation comprises a machine learning approach.

11. The method of claim 1, further determining a downhole formation clay content.

12. The method of claim 1, further determining a downhole formation mineralogy and matrix properties.

13. The method of claim 1, wherein the dopant produces a predictable gamma radiation above 0.5 MeV.

14. The method of claim 1, wherein the dopant produces a background spectrum due to its gamma radiation above 0.5 MeV that does not interfere with a spectrum due to the elemental composition of the downhole formation.

15. The method of claim 1, wherein extracting the elemental composition of the downhole formation comprises removing a background spectrum due to the dopant, wherein the dopant produces a predictable gamma radiation above 0.5 MeV.

16. The method of claim 1, wherein the borehole fluid comprises drilling fluid, water, brine, completion fluid, wellbore fluid treatment, or any combination thereof.

17. A system to determine an elemental composition of a downhole formation comprising:
    a dopant configured to be disposed in a borehole fluid, wherein the dopant comprises at least one neutron absorber and wherein the dopant prevents at least in part one or more borehole gamma rays from being formed in the borehole; and
    a pulsed neutron logging tool comprising a generation area and a detection area separated by a shield,
        wherein the generation area comprises a pulsed neutron generator packaged in a housing, wherein the pulsed neutron generator comprises a neutron tube and a high voltage ladder power supply,
        wherein the detection area comprises a near gamma ray scintillator detector, a far gamma ray scintillator detector, and a long gamma ray scintillator detector, and
    a shielding formed of a heavy metal.

18. The system of claim 17, wherein the detection area comprises a gamma ray detector and a near thermal neutron detector located side-by-side at the same distance from the pulsed neutron generator.

19. The system of claim 17, wherein the detection area comprises a gamma ray detector and a far thermal neutron detector located side-by-side at the same distance from the pulsed neutron generator.

20. The system of claim 17, wherein the pulsed neutron generator is replaced by a continuous neutron source.

* * * * *